United States Patent
Yoshiba et al.

(10) Patent No.: US 12,221,699 B2
(45) Date of Patent: Feb. 11, 2025

(54) PLATING STACK

(71) Applicant: JAPAN PURE CHEMICAL CO., LTD., Tokyo (JP)

(72) Inventors: Kenji Yoshiba, Tokyo (JP); Yusuke Yaguchi, Tokyo (JP); Hiroshi Minowa, Tokyo (JP)

(73) Assignee: JAPAN PURE CHEMICAL CO., LTD., Tokyo (JP)

( * ) Notice: Subject to any disclaimer, the term of this patent is extended or adjusted under 35 U.S.C. 154(b) by 107 days.

(21) Appl. No.: 17/799,962

(22) PCT Filed: Feb. 3, 2021

(86) PCT No.: PCT/JP2021/003848
§ 371 (c)(1),
(2) Date: Aug. 16, 2022

(87) PCT Pub. No.: WO2021/166641
PCT Pub. Date: Aug. 26, 2021

(65) Prior Publication Data
US 2023/0065609 A1    Mar. 2, 2023

(30) Foreign Application Priority Data
Feb. 18, 2020   (JP) .................................. 2020-025109

(51) Int. Cl.
*C23C 18/16* (2006.01)
*C23C 18/24* (2006.01)
(Continued)

(52) U.S. Cl.
CPC .......... *C23C 18/1651* (2013.01); *C23C 18/24* (2013.01); *C23C 18/34* (2013.01); *C23C 18/42* (2013.01); *C23C 18/54* (2013.01)

(58) Field of Classification Search
None
See application file for complete search history.

(56) References Cited

U.S. PATENT DOCUMENTS

| | | | |
|---|---|---|---|
| 6,596,621 B1 * | 7/2003 | Copeland | H01L 24/05 438/615 |
| 2014/0332259 A1 | 11/2014 | Tsuchida et al. | |
| 2019/0345612 A1 | 11/2019 | Tanabe et al. | |

FOREIGN PATENT DOCUMENTS

| | | |
|---|---|---|
| CN | 108866548 A | 11/2018 |
| CN | 109312463 A | 2/2019 |

(Continued)

OTHER PUBLICATIONS

Machine Translation of CN 108866548 A (Year: 2018).*
(Continued)

*Primary Examiner* — Shamim Ahmed
*Assistant Examiner* — Bradford M Gates
(74) *Attorney, Agent, or Firm* — WHDA, LLP (57) ABSTRACT

The problem of the present invention is to provide a plating stack (a stack of plating films) for applying on surface of conductor circuits or the like, the plating stack can maintain high bond strength when solder is bonded on that and can be produced stably. In the method for producing a plating stack of the present invention, a plating layer A mainly composed of a second metal is deposited on an object to be plated S mainly composed of a first metal by a substitution reaction, then a plating layer B mainly composed of palladium is deposited on the plating layer A, and then a plating layer C mainly composed of nickel is deposited on the plating layer B by a redox reaction. The first metal is, for example, copper. The second metal is, for example, gold, platinum or silver.

14 Claims, 1 Drawing Sheet

(51) Int. Cl.
  *C23C 18/34*   (2006.01)
  *C23C 18/42*   (2006.01)
  *C23C 18/54*   (2006.01)

(56) References Cited

FOREIGN PATENT DOCUMENTS

| | | |
|---|---|---|
| JP | 2007-31826 A | 2/2007 |
| JP | 2013-155410 A | 8/2013 |
| JP | 2014-129612 A | 7/2014 |
| JP | 2015-82534 A | 4/2015 |
| JP | 2015-137418 A | 7/2015 |
| TW | 201819681 A | 6/2018 |

OTHER PUBLICATIONS

Office Action dated Dec. 1, 2023, issued in counterpart JP application No. 202180014154.4, with English translation. (10 pages).

Office Action dated Jun. 26, 2023, issued in counterpart CN application No. 202180014154.4, with English translation. (18 pages).

International Search Report dated Mar. 16, 2021, issued in counterpart International Application No. PCT/JP2021/003848. (2 pages).

Notice of Reasons for Refusal dated May 19, 2020, issued in counterpart of Japanese Patent Application No. 2020-025109, with English Translation. (4 pages).

Office Action dated Sep. 6, 2024, issued in counterpart TW Application No. 110104250, with English translation. (11 pages).

\* cited by examiner

PLATING STACK

TECHNICAL FIELD

The present invention relates to a method for producing a plating stack, and more specifically to a method for producing a plating stack which is formed on a conductor circuit or the like.

BACKGROUND ART

Generally, a semiconductor device has a conductor circuit made of a metal having a low electrical resistance such as copper or silver. Further, for almost all conductor circuits, solder bonding or wire bonding is performed.

However, when surfaces of these conductor circuits are oxidized, solder bonding and wire bonding becomes difficult.

Therefore, a plating film is formed on a surface of an object to be plated that forms conductor circuits, and then solder bonding or wire bonding is performed on the plating film.

In particular, with the recent miniaturization and densification of wiring, the application of the electroless plating technique that does not require the wiring for electrolytic plating, is generally performed.

Among them, three-layer film composed of electroless nickel, electroless palladium and electroless gold (ENEPIG film) is frequently used as film formed on surface of conductor circuits, which are suitable for solder bonding and wire bonding (for example, Patent Documents 1 to 3).

There are two kinds of methods for formation of film by electroless plating: plating mainly by substitution reactions (hereinafter sometimes referred to as "substitution plating"), and plating mainly by reduction reactions (hereafter, sometimes referred to as "reduction plating").

Substitution plating is mainly the following reaction. That is, when an object to be plated is immersed in a solution (hereinafter sometimes referred to as "plating solution") containing ions of "metal for forming a plating film", component metal of the object to be plated becomes metal ions and elutes into the plating solution. At the same time, released electrons are given to the ions of "metal for forming a plating film", and the ions given electrons the are deposited as metal on the surface of the object to be plated.

Reduction plating is mainly the following reaction. That is, when an object to be plated is immersed in a plating solution containing a reducing agent, oxidation reaction of a reducing agent proceeds. At the same time, released electrons are given to the ions of "metal for forming a plating film", and the ions given electrons the are deposited as metal on the surface of the object to be plated.

Conventionally, the specification of nickel/palladium/gold=5 μm/0.1 μm/0.1 μm or so, was frequently used as the film thickness of ENEPIG film. However, according to the further miniaturization and densification of wiring, the specifications of reducing the nickel film thickness of ENEPIG film to about 0.2 μm have increased in recent years.

When the surface of an object to be plated on which electroless nickel plating is performed is copper or the like, there are many cases in which plating reaction does not proceed or hardly to proceed.

For this reason, when performing electroless nickel plating on the surface of an object to be plated composed of copper or the like, it has been proposed that electroless nickel plating should be performed after adding palladium or its alloys, etc. as catalysts, on the object to be plated.

Substitution plating is frequently used in the addition of palladium or its alloys, etc. as catalysts (for example, Patent Documents 4).

In many cases, substitution plating is used in the addition of palladium or its alloys as catalysts.

However, there were following problems when adding palladium or its alloys as catalysts. That is, during the addition of catalysts, an object to be plated was locally corroded and an oxidation layer was formed on the surface of the object to be plated. As a result, voids were likely to generate at the interface between an object to be plated and plating layer.

Generation of voids was not a very serious problem when film thickness of nickel plating layer is about 5 μm. However, in recent years, since the film thickness of nickel plating layer has become thinner up to about 0.2 μm, the problem that good bondability cannot be obtained during solder bonding, has become apparent.

Recently, since miniaturization and densification of wiring of conductor circuit is progressing more and more, development of a technology capable of performing solder bonding of such conductor circuit reliably, is desired.

PRIOR ART DOCUMENTS

Patent Documents

Patent Document 1: JP 2007-031826 A
Patent Document 2: JP 2013-155410 A
Patent Document 3: JP 2015-082534 A
Patent Document 4: JP 2015-137418 A

SUMMARY OF THE INVENTION

Problems to be Solved by the Invention

The present invention has been accomplished in view of the above-mentioned background art, and a problem to be solved is to provide a plating stack (a stack of plating films) for applying on surface of conductor circuits or the like. The plating stack can maintain high bond strength when solder is bonded on that and can be produced stably.

Means for Solving the Problems

As a result of extensive studies to solve the above problems, the present inventor has found the following and has completed the present invention. That is, when palladium or its alloys are added directly as catalysts on an object to be plated, problems such as generation of local corrosion of the object to be plated or formation of an oxidative layer on the surface of the object to be plated, are likely to occur. Such problems can be prevented by arranging a protective layer between a layer of palladium or its alloys (a catalytic layer) and the object to be plated. Here, the "protective layer" is a layer for preventing local corrosion of the object to be plated and formation of an oxidative layer on the surface of the object to be plated. As a result, it is possible to stably produce a nickel layer in which voids hardly generate, on the catalytic layer. A plating stack produced in this way has good solder bondability.

That is, the present invention is directed to a method for producing a plating stack in which a plating layer A mainly composed of a second metal is deposited on an object to be plated mainly composed of a first metal, then a plating layer B mainly composed of palladium is deposited on the plating layer A, and then a plating layer C mainly composed of nickel is deposited on the plating layer B, wherein the plating layer B is a substitution plating layer formed by a substitution reaction between an ion of palladium contained in a substitution plating solution, and the first metal contained in the object to be plated or the second metal contained in the plating layer A, wherein the plating layer C is a reduction plating layer formed by a redox reaction between a reducing agent and a nickel ion contained in a reduction plating solution.

Effects of the Invention

According to the present invention, a plating stack (a stack of plating films) for applying on surface of conductor circuits or the like, can be provided. The plating stack can maintain good bondability when solder is bonded on that and can be produced stably.

In particular, when film thickness of a nickel plating layer is thin, defective solder bonding due to generation of voids is likely to occur. According to the present invention, even when the nickel plating layer is thin, voids hardly generate and good solder bonding can be performed. Therefore, consumption of nickel, which is expensive, can be saved, and it is possible to reduce the cost.

EMBODIMENTS TO CARRY OUT THE INVENTION

In the following, the present invention is explained, but the present invention is not limited by the following specific embodiments, and can be optionally changed.

Figure 1:
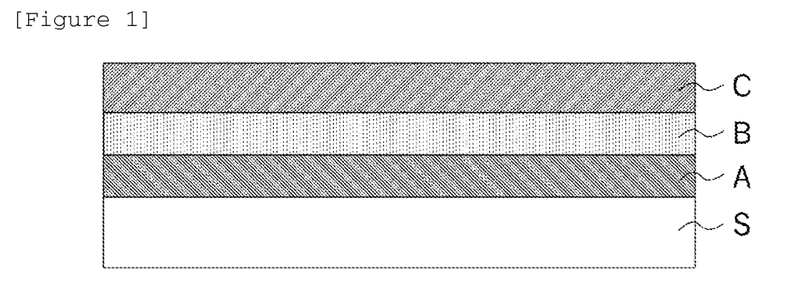
FIG. 1 is a schematic diagram showing the structure of the plating stack produced by the present invention.

The present invention relates to a method for producing a plating stack in which a plating layer A mainly composed of a second metal is deposited on an object to be plated S mainly composed of a first metal, then a plating layer B mainly composed of palladium is deposited on the plating layer A, and then a plating layer C mainly composed of nickel is deposited on the plating layer B. FIG. 1 shows the structure of the plating stack produced by the present invention.

In the present specification, "plating layer" means a layer of metal formed by plating. The "plating layer" is not limited to a film-like layer without pores. A film-like layer with pores and nucleus-like layer is also included in the "plating layer".

"First metal" and "second metal", which constitute the plating layer in the present invention are metals which differ from each other. Besides, "First metal" and "second metal" are neither nickel nor palladium.

Metals which constitute the plating layer in the present invention are not limited to pure metals, and may be alloys. In addition, elements other than metals (e.g., phosphorus (P), sulfur(S), boron (B), carbon (C), and the like) may be contained in the plating layer in the present invention.

"A plating layer is mainly composed of metal X" means that, metal X is the most abundant metal on a molar basis in the plating layer.

In the present invention, content ratio of metal of the main component against the amount of metals which constitute each plating layer is preferably 70 mol % or more, more preferably 80 mol % or more, and most preferably 90 mol % or more.

Examples of the plating layer in the present invention include a substitution plating layer formed by a substitution reaction, a reduction plating layer formed by a redox reaction, and the like.

"Formed by a substitution reaction" includes not only a case where a plating layer is formed only by a substitution reaction but also a case where a substitution reaction and a redox reaction occur simultaneously to form a plating layer. When a substitution reaction and a reduction reaction occur simultaneously, among the metals in the plating layer, preferably 60% or more is formed by the substitution reaction, more preferably 80% or more is formed by the substitution reaction, and particularly preferably 90% or more is formed by the substitution reaction.

"Formed by a redox reaction" includes not only a case where a plating layer is formed only by a redox reaction but also a case where a redox reaction and a substitution reaction occur simultaneously to form a plating layer. When a redox reaction and a substitution reaction occur simultaneously, among the metals in the plating layer, preferably 60% or more is formed by the redox reaction, more preferably 80% or more is formed by the redox reaction, and particularly preferably 90% or more is formed by the redox reaction.

<Object to be Plated S>

An object to be plated S is a substrate for the formation of a plating layer on it. The object to be plated S is mainly composed of a first metal. The first metal is a metal that forms conductor circuits. Examples of the first metal are copper (Cu) and silver (Ag).

<Plating Layer A>

A plating layer A is a plating layer to be deposited on an object to be plated S. The plating layer A is mainly composed of a second metal.

The second metal is a metal that can be deposited from a plating solution to the object to be plated S without local corrosion of the object to be plated S or formation of an oxidation layer on the surface of the object to be plated S. The second metal is not particularly limited as long as it can be stably present in an aqueous solution.

Examples of the second metal are gold (Au), silver (Ag), platinum (Pt), rhodium (Rh), iridium (Ir), indium (In), tin (Sn), ruthenium (Ru), iron (Fe), zinc (Zn) and cobalt (Co).

Gold, silver or platinum is particularly preferable to be used as the second metal, because they can easily form on the surface of the object to be plated as a plating layer A and they have great preventive effects of local corrosion of the object to be plated S and formation of the oxidation layer on the surface of the plating body S.

Plating solution for forming the plating layer A is not particularly limited, as long as the solution does not locally corrode the object to be plated, and does not form an oxidation layer on the surface of the object to be plated at the time of formation of the plating layer A. The plating solution for forming the plating layer A may be a substitution plating solution or reduction plating solution.

A substitution plating solution for forming a plating layer A contains a water-soluble metal salt (a salt of a second metal). The second metal has an ionization tendency capable of substitution with a first metal. In other words, when the plating layer A is formed by the substitution plating solution, the second metal has lower ionization tendency than that of the first metal.

A reduction plating solution for forming the plating layer A contains a water-soluble metal salt (a salt of a second metal) and a reducing agent.

Examples of the reducing agent are hydrazine, sodium borohydride and formaldehyde. One type of the reducing agents may be used alone, or two or more type thereof may be used.

A water-soluble metal salt (a salt of a second metal) contained in a plating solution for forming a plating layer A is not particularly limited.

When the second metal is gold, examples of the salt of a second metal are gold cyanide salt, gold chloride salt, gold sulfite salt and gold thiosulfate salt.

When the second metal is silver, examples of the salt of a second metal are silver cyanide salt, silver nitrate salt, and silver methanesulfonate salt.

When the second metal is platinum, examples of the salt of a second metal are chloroplatinic acid salt, dinitrodiammine platinum, and hexahydroxoplatinate salt.

Concentration of a water-soluble metal salt (a salt of a second metal) in a plating solution for forming a plating layer A is not particularly limited. The concentration is preferably 5 ppm or more, more preferably 10 ppm or more, and particularly preferably 20 ppm or more. Besides, the concentration is preferably 5000 ppm or less, more preferably 2000 ppm or less, and particularly preferably 1000 ppm or less.

When the concentration is more than or equal to the above lower limit, formation rate of the plating layer A becomes sufficiently large. Further, when the concentration is equal to or lower than the above upper limit, it is advantageous in terms of cost.

PH of the plating solution for forming a plating layer A is preferably 2.5 or more, more preferably 3 or more, and particularly preferably 4 or more. Besides, the pH is preferably 9.5 or less, more preferably 9 or less, and particularly preferably 8 or less.

When the pH is within the above range, local corrosion of the object to be plated and formation of an oxidation layer on the surface of the plating body are unlikely to occur, thus it is easy to keep a plating stack at high quality.

Film thickness of a plating layer A is not particularly limited. The film thickness is preferably 0.0003 μm or more, more preferably 0.0005 μm or more, and particularly preferably 0.001 μm or more. Besides, the film thickness is preferably 0.05 μm or less, more preferably 0.04 μm or less, and particularly preferably 0.02 μm or less.

When the film thickness is more than or equal to the above lower limit, in the next step, that is, formation of a plating layer B, local corrosion of the object to be plated and formation of an oxidation layer on the surface of the plating body are unlikely to occur, thus it is easy to keep a plating stack at high quality. Further, when the film thickness is equal to or lower than the above upper limit, it is advantageous in terms of cost.

Since the plating layer A is not the outermost layer, the plating layer A is not necessary to be flat film. The plating layer A may be porous film or nucleus-like layer.

The "film thickness" means the average film thickness (the same applies below in the present specification).

Temperature of a plating solution at the time of forming a plating layer A is preferably 10° C. or higher, more preferably 15° C. or higher, and particularly preferably 20° C. or higher. Besides, the temperature is preferably 100° C. or lower, more preferably 95° C. or lower, and particularly preferably 90° C. or lower.

Further, time for forming the plating layer A (plating time) is preferably 0.5 minutes or more, more preferably 1 minute or more, and particularly preferably 2 minutes or more. Besides, the plating time is preferably 30 minutes or less, more preferably 20 minutes or less, and particularly preferably 10 minutes or less.

When the temperature and the plating time are within the above range, the film thickness tends to be within the above range.

As mentioned above, the plating layer A is not required for thickness. Therefore, it is preferable to form the plating layer A with a substitution plating solution in terms of cost and avoidance of effect caused by the reducing agent. That is, it is preferable that the plating layer A is a substitution plating layer formed by a substitution reaction between an ion of the second metal contained in a substitution plating solution and the first metal contained in the object to be plated.

<Plating layer B>

A plating layer B is a plating layer to be deposited on a plating layer A. The plating layer B is mainly composed of palladium.

On the surface of palladium, which is the main component of the plating layer B, reduction reaction proceeds easily, then a nickel layer (a plating layer C) is easily formed by reduction plating.

The plating layer B is a substitution plating layer formed by a substitution reaction between a palladium ion and the first metal contained in the object to be plated or the second metal contained in the plating layer A.

As described above, a plating layer A may be porous film or nucleus-like layer. Therefore, the substitution reaction for forming the plating layer B may occur between a palladium ion and the first metal contained in the object to be plated S.

A water-soluble palladium salt contained in a plating solution for forming a plating layer B (a substitution palladium plating solution) is not particularly limited. Examples of the water-soluble palladium salt are palladium chloride, dichlorotetraamine palladium salt and dinitrotetraamine palladium salt.

Concentration of a water-soluble palladium salt in a plating solution for forming a plating layer B is not particularly limited. The concentration is preferably 5 ppm or more, more preferably 10 ppm or more, and particularly preferably 20 ppm or more. Besides, the concentration is preferably 5000 ppm or less, more preferably 2000 ppm or less, and particularly preferably 1000 ppm or less.

When the concentration is more than or equal to the above lower limit, formation rate of the plating layer B becomes sufficiently large. Further, when the concentration is equal to or lower than the above upper limit, it is advantageous in terms of cost.

PH of the plating solution for forming a plating layer B is preferably 2.5 or more, more preferably 3 or more, and particularly preferably 4 or more. Besides, the pH is preferably 9.5 or less, more preferably 9 or less, and particularly preferably 8 or less.

When the pH is within the above range, local corrosion of the object to be plated and formation of an oxidation layer on the surface of the plating body are unlikely to occur, thus it is easy to keep a plating stack at high quality.

Film thickness of a plating layer B is not particularly limited. The film thickness is preferably 0.0003 μm or more, more preferably 0.0005 μm or more, and particularly preferably 0.001 μm or more. Besides, the film thickness is preferably 0.05 μm or less, more preferably 0.04 μm or less, and particularly preferably 0.02 μm or less.

When the film thickness is more than or equal to the above lower limit, the next step, that is, formation of a plating layer C tends to proceed stably. Further, when the film thickness is equal to or lower than the above upper limit, it is advantageous in terms of cost.

Temperature of a plating solution at the time of forming a plating layer B is preferably 10° C. or higher, more preferably 15° C. or higher, and particularly preferably 200° C. or higher. Besides, the temperature is preferably 100° C. or lower, more preferably 95° C. or lower, and particularly preferably 90° C. or lower.

Further, time for forming the plating layer B (plating time) is preferably 0.5 minutes or more, more preferably 1 minute or more, and particularly preferably 2 minutes or more. Besides, the plating time is preferably 30 minutes or less, more preferably 20 minutes or less, and particularly preferably 10 minutes or less.

When the temperature and the plating time are within the above range, the film thickness tends to be within the above range.

<Plating Layer C>

A plating layer C is a plating layer to be deposited on a plating layer B. The plating layer C is mainly composed of nickel.

The plating layer C is a reduction plating layer formed by a redox reaction between a reducing agent and a nickel ion contained in a reduction plating solution.

A plating solution for forming plating layer C (a reduction nickel plating solution) contains a water-soluble nickel salt and a reducing agent.

Examples of the reducing agent are hypophosphorous acid and its salts, dimethylamine borane, and hydrazine. One type of the reducing agents may be used alone, or two or more type thereof may be used.

A water-soluble nickel salt contained in a plating solution for forming a plating layer C is not particularly limited. Examples of the water-soluble nickel salt are nickel chloride, nickel sulfate, nickel sulfamate, nickel carbonate, nickel acetate, nickel hypophosphite, and nickel citrate.

Concentration of a water-soluble nickel salt in a plating solution for forming a plating layer C is not particularly limited. The concentration is preferably 50 ppm or more, more preferably 100 ppm or more, and particularly preferably 200 ppm or more. Besides, the concentration is preferably 50000 ppm or less, more preferably 20000 ppm or less, and particularly preferably 10000 ppm or less.

When the concentration is more than or equal to the above lower limit, formation rate of the plating layer C becomes sufficiently large. Further, when the concentration is equal to or lower than the above upper limit, it is advantageous in terms of cost.

The plating layer C may contain phosphorus as an impurity. When hypophosphorous acid or its salts are used as a reducing agent, phosphorus derived from the reducing agent is contained in the plating layer C.

It is desirable that the content of phosphorus is about 2% by mass to 25% by mass.

PH of the plating solution for forming a plating layer C is preferably 2.5 or more, more preferably 3 or more, and particularly preferably 4 or more. Besides, the pH is preferably 9.5 or less, more preferably 9 or less, and particularly preferably 8 or less.

When the pH is within the above range, precipitation of the metal salt and deposition of the metal in the plating tank due to an abnormal reaction in the plating solution are less likely to occur.

The plating layer C is a layer formed for the purpose of preventing diffusion of the first metal, which constitute the object to be plated, to the surface of the plating stack, and so on. Therefore, the film thickness of plating layer C is thicker than those of the plating layer A and the plating layer B. The plating layer C is formed by reduction plating, which is capable of forming a thick film.

In concrete terms, film thickness of a plating layer C is not particularly limited. The film thickness is preferably 0.01 μm or more, more preferably 0.02 μm or more, and particularly preferably 0.03 μm or more. Besides, the film thickness is preferably 15 μm or less, more preferably 10 μm or less, and particularly preferably 5 μm or less.

When the film thickness is more than or equal to the above lower limit, performance of the film can be sufficiently exerted. Further, when the film thickness is equal to or lower than the above upper limit, it is advantageous in terms of cost.

Temperature of a plating solution at the time of forming a plating layer C is preferably 10° C. or higher, more preferably 15° C. or higher, and particularly preferably 20° C. or higher. Besides, the temperature is preferably 100° C. or lower, more preferably 95° C. or lower, and particularly preferably 90° C. or lower.

Further, time for forming the plating layer C (plating time) is preferably 0.5 minutes or more, more preferably 1 minute or more, and particularly preferably 2 minutes or more. Besides, the plating time is preferably 240 minutes or less, more preferably 120 minutes or less, and particularly preferably 60 minutes or less.

When the temperature and the plating time are within the above range, the film thickness tends to be within the above range.

<Plating Layer D>

Figure 2:
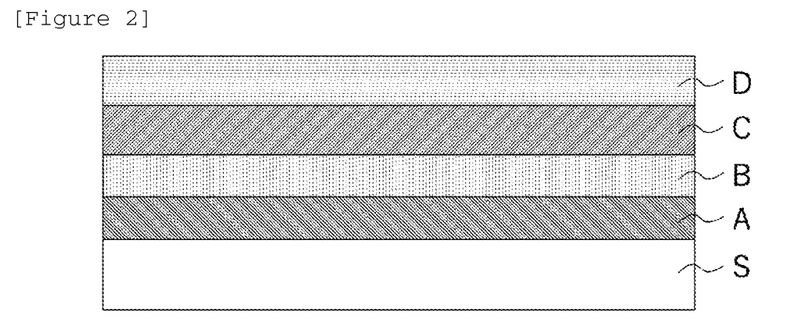
FIG. 2 is a schematic diagram showing the structure of the plating stack produced by the present invention (where the plating stack has a plating layer D).

In the present invention, after the plating layer C is deposited, a plating layer D mainly composed of a metal which differs from nickel of the plating layer C, may be deposited on the plating layer C. FIG. 2 shows the structure of the plating stack produced by in that way.

A plating layer D is a plating layer to be deposited on a plating layer C. The main component metal of the plating layer D differs from that of the plating layer C, nickel.

The metal that constitutes the plating layer D may be an elemental metal, and may be an alloy.

Metal of the main component of the plating layer D is not particularly limited as long as it can be deposited from the plating solution and can be stably present in an aqueous solution. Metal of the main component of the plating layer D can be selected according to the purpose of formation of a plating stack.

For example, gold, palladium and so on may be used as the main component of the plating layer D in case the purpose is to prevent oxidation of the surface of the film.

The plating solution for forming the plating layer D may be a substitution plating solution or reduction plating solution.

A plating solution for forming the plating layer D contains a water-soluble metal salt. The water-soluble metal salt is not particularly limited.

For example, when the main component of the plating layer D is gold, examples of the water-soluble metal salt are gold cyanide salt, gold chloride salt, gold sulfite salt and gold thiosulfate salt. When the main component of the plating layer D is palladium, examples of the water-soluble metal salt are palladium chloride, dichlorotetraamine palladium salt and dinitrotetraamine palladium salt.

Concentration of a water-soluble metal salt in a plating solution for forming a plating layer D is not particularly limited. The concentration is preferably 5 ppm or more, more preferably 10 ppm or more, and particularly preferably 20 ppm or more. Besides, the concentration is preferably 5000 ppm or less, more preferably 2000 ppm or less, and particularly preferably 1000 ppm or less.

When the concentration is more than or equal to the above lower limit, formation rate of the plating layer D becomes sufficiently large. Further, when the concentration is equal to or lower than the above upper limit, it is advantageous in terms of cost.

PH of the plating solution for forming a plating layer D is preferably 2.5 or more, more preferably 3 or more, and particularly preferably 4 or more. Besides, the pH is preferably 9.5 or less, more preferably 9 or less, and particularly preferably 8 or less.

When the pH is within the above range, precipitation of the metal salt and deposition of the metal in the plating tank due to an abnormal reaction in the plating solution are less likely to occur.

Film thickness of a plating layer D is not particularly limited. The film thickness is preferably 0.01 µm or more, more preferably 0.02 µm or more, and particularly preferably 0.03 µm or more. Besides, the film thickness is preferably 1 µm or less, more preferably 0.7 µm or less, and particularly preferably 0.5 µm or less.

When the film thickness is more than or equal to the above lower limit, performance of the film can be sufficiently exerted. Further, when the film thickness is equal to or lower than the above upper limit, it is advantageous in terms of cost.

Temperature of a plating solution at the time of forming a plating layer D is preferably 10° C. or higher, more preferably 15° C. or higher, and particularly preferably 200° C. or higher. Besides, the temperature is preferably 100° C. or lower, more preferably 95° C. or lower, and particularly preferably 90° C. or lower.

Further, time for forming the plating layer D (plating time) is preferably 0.5 minutes or more, more preferably 1 minute or more, and particularly preferably 2 minutes or more. Besides, the plating time is preferably 240 minutes or less, more preferably 120 minutes or less, and particularly preferably 60 minutes or less.

When the temperature and the plating time are within the above range, the film thickness tends to be within the above range.

<Plating Layer E>

Figure 3:
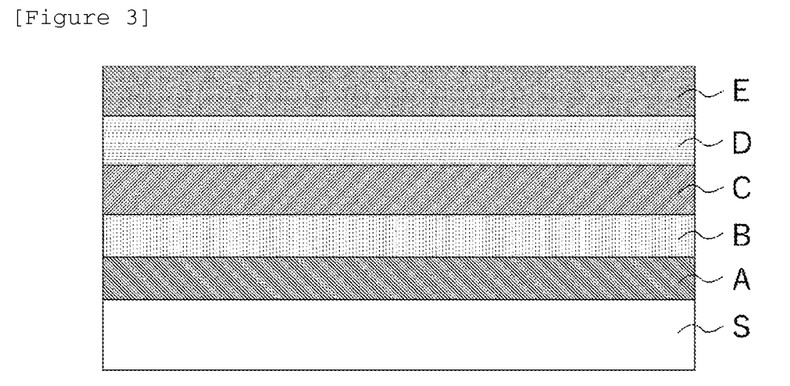
FIG. 3 is a schematic diagram showing the structure of the plating stack produced by the present invention (where the plating stack has a plating layer D and a plating layer E).

In the present invention, after the plating layer D is deposited, a plating layer E mainly composed of a metal which differs from that of the plating layer D may be deposited on the plating layer D. FIG. 3 shows the structure of the plating stack produced by in that way.

A plating layer E is a plating layer to be deposited on a plating layer D. The main component metal of the plating layer D differs from that of the plating layer D.

The metal that constitutes the plating layer E may be an elemental metal, and may be an alloy.

Metal of the main component of the plating layer E is not particularly limited as long as it can be deposited from the plating solution and can be stably present in an aqueous solution. Metal of the main component of the plating layer E can be selected according to the purpose of formation of a plating stack.

For example, gold and so on may be used as the main component of the plating layer E in case the purpose is to improve wire bondability of gold.

The plating solution for forming the plating layer E may be a substitution plating solution or reduction plating solution.

A plating solution for forming the plating layer E contains a water-soluble metal salt. The water-soluble metal salt is not particularly limited.

For example, when the main component of the plating layer E is gold, examples of the water-soluble metal salt are gold cyanide salt, gold chloride salt, gold sulfite salt and gold thiosulfate salt.

Concentration of a water-soluble metal salt in a plating solution for forming a plating layer E is not particularly limited. The concentration is preferably 5 ppm or more, more preferably 10 ppm or more, and particularly preferably 20 ppm or more. Besides, the concentration is preferably 5000 ppm or less, more preferably 2000 ppm or less, and particularly preferably 1000 ppm or less.

When the concentration is more than or equal to the above lower limit, formation rate of the plating layer D becomes sufficiently large. Further, when the concentration is equal to or lower than the above upper limit, it is advantageous in terms of cost.

PH of the plating solution for forming a plating layer E is preferably 2.5 or more, more preferably 3 or more, and particularly preferably 4 or more. Besides, the pH is preferably 9.5 or less, more preferably 9 or less, and particularly preferably 8 or less.

When the pH is within the above range, precipitation of the metal salt and deposition of the metal in the plating tank due to an abnormal reaction in the plating solution are less likely to occur.

Film thickness of a plating layer E is not particularly limited. The film thickness is preferably 0.01 µm or more, more preferably 0.02 µm or more, and particularly preferably 0.03 µm or more. Besides, the film thickness is preferably 1 µm or less, more preferably 0.7 µm or less, and particularly preferably 0.5 µm or less.

When the film thickness is more than or equal to the above lower limit, performance of the film can be sufficiently exerted. Further, when the film thickness is equal to or lower than the above upper limit, it is advantageous in terms of cost.

Temperature of a plating solution at the time of forming a plating layer E is preferably 10° C. or higher, more preferably 15° C. or higher, and particularly preferably 20° C. or higher. Besides, the temperature is preferably 100° C. or lower, more preferably 95° C. or lower, and particularly preferably 90° C. or lower.

Further, time for forming the plating layer E (plating time) is preferably 0.5 minutes or more, more preferably 1 minute or more, and particularly preferably 2 minutes or more. Besides, the plating time is preferably 240 minutes or less, more preferably 120 minutes or less, and particularly preferably 60 minutes or less.

When the temperature and the plating time are within the above range, the film thickness tends to be within the above range.

A plating stack produced by the method of the present invention can maintain a high bond strength upon soldering on it and can be produced stably. Although above operation and principle are not clear, but are deduced as follows. However, the present invention is not limited to the scope of the following operation and principle.

When a layer of palladium or its alloys (a catalytic layer) added directly to an object to be plated, local corrosion of the object to be plated and formation of an oxidized layer on the surface of the object to be plated occur. As a result, voids generate at the interface between an object to be plated and plating layer. In contrast, by arranging a protective layer between a catalytic layer and the object to be plated, generation of voids can be suppressed. Here, the "protective layer" is a layer for preventing local corrosion of the object to be plated and formation of an oxidative layer on the surface of the object to be plated.

Since generation of voids is suppressed, it is presumed that solder bondability becomes good even when the nickel layer on the layer of palladium or its alloys is thin.

EXAMPLES

Hereinafter, the present invention will be explained more specifically by showing Examples and Comparative Examples; but the present invention is not limited to them unless beyond its scope.

Example 1

[Production of a Plating Stack]

A glass cloth epoxy material (FR-4) was bonded with copper foil. An opening system of φ0.5 mm diameter was arranged on the glass cloth epoxy material to produce a substrate (40 mm×40 mm×1mmt). The substrate was adopted as an object to be plated. In the following manner, a plating stack which is stacked in the order of the object to be plated, a plating layer A, a plating layer B, a plating layer C and a plating layer D was produced.

Degreasing, soft etching and acid cleaning were performed on the object to be plated. Degreasing was carried out using a commercially available cleaning solution (PAC-200, manufactured by Murata Co., Ltd.) for 10 minutes at 50° C. Soft etching was carried out using a commercially available soft etching agent (MEOX, manufactured by Murata Co., Ltd.) for 5 minutes at 30° C. Acid cleaning was carried out using 10v/v % sulfuric acid for 1 minute at room temperature.

A plating layer A was formed using a substitution gold plating solution (IM-GOLD PC, manufactured by Japan Pure Chemical Co., Ltd.). Temperature of the plating solution for forming the plating layer A was 80° C., and plating time was 5 minutes.

Next, a plating layer B was formed using a substitution palladium plating solution (IM-Pd NCA, manufactured by Japan Pure Chemical Co., Ltd.). Temperature of the plating solution for forming the plating layer B was 55° C., and plating time was 5 minutes.

Next, a plating layer C was formed using an electroless nickel plating solution (ICP-Nicoron GM, manufactured by Okuno Chemical Industries Co., Ltd.). Temperature of the plating solution for forming the plating layer C was 85° C., and plating time was 1 minute.

Next, a plating layer D was formed using a substitution gold plating solution (IM-GOLD CN, manufactured by Japan Pure Chemical Co., Ltd.). Temperature of the plating solution for forming the plating layer D was 80° C., and plating time was 5 minutes.

[Measurement of Film Thickness of a Plating Layer]

Thickness of each plating layer formed was measured by a fluorescent X-ray spectroscopy analyzer (FT-150, Hitachi High-Tech Science, Co., Inc.).

The film thickness of the plating layer A obtained in Example 1 was 0.005 μm, the thickness of the plating layer B was 0.005 μm, the thickness of the plating layer C was 0.2 μm, and the thickness of the plating layer D was 0.03 μm.

[Evaluation of Voids]

A focused ion beam was irradiated from above the plating stack produced by stacking plating layers on the object to be plated. A hole with a length of about 50 μm, a width of about 50 μm, and a depth of about 20 μm, was formed, and a cross section of the plating stack was exposed.

Voids were not confirmed in the cross section of the plating stack obtained in Example 1.

[Evaluation of Solder Bondability]

The plating stack produced by stacking plating layers on the object to be plated was preheated. Then, solder balls (Senju Metal Industry Co., Ltd., SAC405, φ0.6 mm) were implemented on the SR opening using a reflow device (Japan Pulse Technology Laboratory Co., Ltd., RF-430-M2). Ball-pull test was performed using a bond tester (Dage Co., Ltd., bond tester SERIES4000 OPTIMA), and the rupture mode was evaluated.

The ball-pull test was performed at 20 points for each plating stack. The rupture inside the solder was evaluated as "good". The rupture at the interface of solder and ground was evaluated as "bad". Then the percentage of "good" was calculated as good product rate of solder bondability (8).

Conditions such as implementation of solder are as follows.

Reflow environment: Under nitrogen atmosphere
Heating before reflow: 175° C. for 4 hours
Number of reflow before implementation: 3 times
Flux: KESTER Co., Ltd.; TSF6502
Test speed: 5000 μm/sec
Aging after solder mounting: 1 hour Solder bondability of the plating stack obtained in Example 1 was good.

Example 2

A plating stack was produced and evaluated as in Example 1, except that the plating time for forming the plating layer A was set to 10 minutes.

The film thickness of the plating layer A obtained was 0.01 μm, the thickness of the plating layer B was 0.005 μm, the thickness of the plating layer C was 0.2 μm, and the thickness of the plating layer D was 0.03 μm.

Voids were not confirmed in the cross section of the plating stack obtained, and solder bondability was good.

Example 3

A plating stack was produced and evaluated as in Example 1, except that the plating time for forming the plating layer B was set to 10 minutes.

The film thickness of the plating layer A obtained was 0.005 μm, the thickness of the plating layer B was 0.01 μm, the thickness of the plating layer C was 0.2 μm, and the thickness of the plating layer D was 0.03 μm.

Voids were not confirmed in the cross section of the plating stack obtained, and solder bondability was good.

Example 4

A plating stack was produced and evaluated as in Example 1, except that the plating time for forming the plating layer C was set to 0.5 minutes.

The film thickness of the plating layer A obtained was 0.005 μm, the thickness of the plating layer B was 0.005 μm, the thickness of the plating layer C was 0.1 μm, and the thickness of the plating layer D was 0.03 μm.

Voids were not confirmed in the cross section of the plating stack obtained, and solder bondability was good.

Example 5

A plating stack was produced and evaluated as in Example 1, except that a plating layer A was formed using a substitution silver plating solution (IM-SILVER, manufactured by Japan Pure Chemical Co., Ltd.), that the temperature of the plating solution was set to 45° C. and that the plating time was set to 1 minute.

The film thickness of the plating layer A obtained was 0.005 μm, the thickness of the plating layer B was 0.005 μm, the thickness of the plating layer C was 0.2 μm, and the thickness of the plating layer D was 0.03 μm.

Voids were not confirmed in the cross section of the plating stack obtained, and solder bondability was good.

Example 6

A plating stack was produced and evaluated as in Example 1, except that a plating layer A was formed using a commercially available substitution platinum plating solution (weakly acidic chloroplatinic acid type plating solution) and that the temperature of the plating solution was set to 45° C.

The film thickness of the plating layer A obtained was 0.005 μm, the thickness of the plating layer B was 0.005 μm, the thickness of the plating layer C was 0.2 μm, and the thickness of the plating layer D was 0.03 μm.

Voids were not confirmed in the cross section of the plating stack obtained, and solder bondability was good.

Example 7

A plating stack was produced and evaluated as in Example 1, except that a plating layer A was formed using a reduction gold plating solution (HY-GOLD CN, manufactured by Japan Pure Chemical Co., Ltd.) and that the plating time was set to 1 minute.

The film thickness of the plating layer A obtained was 0.005 μm, the thickness of the plating layer B was 0.005 μm, the thickness of the plating layer C was 0.2 μm, and the thickness of the plating layer D was 0.03 μm.

Voids were not confirmed in the cross section of the plating stack obtained, and solder bondability was good.

Example 8

A plating stack was produced and evaluated as in Example 1, except that a plating layer A was formed using a commercially available reduction silver plating solution (weakly alkaline silver nitrate type plating solution), that the temperature of the plating solution was set to 50° C. and that the plating time was set to 1 minute.

The film thickness of the plating layer A obtained was 0.005 μm, the thickness of the plating layer B was 0.005 μm, the thickness of the plating layer C was 0.2 μm, and the thickness of the plating layer D was 0.03 μm.

Voids were not confirmed in the cross section of the plating stack obtained, and solder bondability was good.

Example 9

A plating stack was produced and evaluated as in Example 1, except that a plating layer A was formed using a reduction platinum plating solution (OT-1, manufactured by Japan Pure Chemical Co., Ltd.), that the temperature of the plating solution was set to 30° C. and that the plating time was set to 1 minute.

The film thickness of the plating layer A obtained was 0.005 μm, the thickness of the plating layer B was 0.005 μm, the thickness of the plating layer C was 0.2 μm, and the thickness of the plating layer D was 0.03 μm.

Voids were not confirmed in the cross section of the plating stack obtained, and solder bondability was good.

Example 10

A plating stack was produced and evaluated as in Example 1, except that a plating layer D was formed using a reduction gold plating solution (HY-GOLD CN, manufactured by Japan Pure Chemical Co., Ltd.) and that the plating time was set to 10 minutes.

The film thickness of the plating layer A obtained was 0.005 μm, the thickness of the plating layer B was 0.005 μm, the thickness of the plating layer C was 0.2 μm, and the thickness of the plating layer D was 0.05 μm.

Voids were not confirmed in the cross section of the plating stack obtained, and solder bondability was good.

Example 11

A plating stack was produced and evaluated as in Example 1, except that a plating layer D was formed using a reduction palladium plating solution (Neo Pallabright, manufactured by Japan Pure Chemical Co., Ltd.), that the temperature of the plating solution was set to 70° C. and that the plating time was set to 10 minutes.

The film thickness of the plating layer A obtained was 0.005 μm, the thickness of the plating layer B was 0.005 μm, the thickness of the plating layer C was 0.2 μm, and the thickness of the plating layer D was 0.1 μm.

Voids were not confirmed in the cross section of the plating stack obtained, and solder bondability was good.

Example 12

After forming of the plating layer D in Example 11, a plating layer E was formed using a reduction gold plating solution (HY-GOLD CN, manufactured by Japan Pure Chemical Co., Ltd.). Temperature of the plating solution for forming the plating layer E was 80° C., and plating time was 10 minutes. The produced plating stack was evaluated as in Example 1.

The film thickness of the plating layer A obtained was 0.005 μm, the thickness of the plating layer B was 0.005 μm, the thickness of the plating layer C was 0.2 μm, the thickness of the plating layer D was 0.1 μm, and the thickness of the plating layer E was 0.05 μm.

Voids were not confirmed in the cross section of the plating stack obtained, and solder bondability was good.

Comparative Example 1

A plating stack was produced and evaluated as in Example 1, except that a plating layer A was not formed but a plating layer B was directly formed on an object to be plated.

The film thickness of the plating layer B obtained was 0.005 μm, the thickness of the plating layer C was 0.2 μm, and the film thickness of the plating layer D was 0.03 μm.

Voids were confirmed in the cross section of the plating stack obtained, and solder bondability was bad.

Comparative Example 2

A plating stack was produced and evaluated as in Example 11, except that a plating layer A was not formed but a plating layer B was directly formed on an object to be plated.

The film thickness of the plating layer B obtained was 0.005 μm, the thickness of the plating layer C was 0.2 μm, and the film thickness of the plating layer D was 0.1 μm.

Voids were confirmed in the cross section of the plating stack obtained, and solder bondability was bad.

Comparative Example 3

A plating stack was produced and evaluated as in Example 12, except that a plating layer A was not formed but a plating layer B was directly formed on an object to be plated.

The film thickness of the plating layer B obtained was 0.005 μm, the thickness of the plating layer C was 0.2 μm, the thickness of the plating layer D was 0.1 μm, and the thickness of the plating layer E was 0.05 μm.

Voids were confirmed in the cross section of the plating stack obtained, and solder bondability was bad.

Comparative Example 4

A plating stack was produced and evaluated as in Example 12, except that a plating layer A was not formed but a plating layer B was directly formed on an object to be plated and that the plating time for forming the plating layer C was set to 25 minutes.

The film thickness of the plating layer B obtained was 0.005 μm, the thickness of the plating layer C was 5 μm, the thickness of the plating layer D was 0.1 μm, and the thickness of the plating layer E was 0.05 μm.

Voids were confirmed in the cross section of the plating stack obtained, but solder bondability was good.

The results of each of the examples and comparative examples are shown in Table 1.

[Table 1]

TABLE 1

| | Plating layer A | | | | | Plating layer B | | | | | Plating layer C | | | | |
|---|---|---|---|---|---|---|---|---|---|---|---|---|---|---|---|
| | Component metal | Method of plating | Temperature (°C) | Time (minutes) | Film thickness (μm) | Component metal | Method of plating | Temperature (°C) | Time (minutes) | Film thickness (μm) | Component metal | Method of plating | Temperature (°C) | Time (minutes) | Film thickness (μm) |
| Example 1 | Gold | Substitution | 80 | 5 | 0.005 | Palladium | Substitution | 55 | 5 | 0.005 | Nickel | Reduction | 85 | 1 | 0.2 |
| Example 2 | Gold | Substitution | 80 | 10 | 0.01 | Palladium | Substitution | 55 | 5 | 0.005 | Nickel | Reduction | 85 | 1 | 0.2 |
| Example 3 | Gold | Substitution | 80 | 5 | 0.005 | Palladium | Substitution | 55 | 10 | 0.01 | Nickel | Reduction | 85 | 1 | 0.2 |
| Example 4 | Gold | Substitution | 80 | 5 | 0.005 | Palladium | Substitution | 55 | 5 | 0.005 | Nickel | Reduction | 85 | 0.5 | 0.1 |
| Example 5 | Silver | Substitution | 80 | 1 | 0.005 | Palladium | Substitution | 55 | 5 | 0.005 | Nickel | Reduction | 85 | 1 | 0.2 |
| Example 6 | Platinum | Substitution | 45 | 5 | 0.005 | Palladium | Substitution | 55 | 5 | 0.005 | Nickel | Reduction | 85 | 1 | 0.2 |
| Example 7 | Gold | Reduction | 45 | 1 | 0.005 | Palladium | Substitution | 55 | 5 | 0.005 | Nickel | Reduction | 85 | 1 | 0.2 |
| Example 8 | Silver | Reduction | 50 | 1 | 0.005 | Palladium | Substitution | 55 | 5 | 0.005 | Nickel | Reduction | 85 | 1 | 0.2 |
| Example 9 | Platinum | Reduction | 30 | 1 | 0.005 | Palladium | Substitution | 55 | 5 | 0.005 | Nickel | Reduction | 85 | 1 | 0.2 |
| Example 10 | Gold | Substitution | 80 | 5 | 0.005 | Palladium | Substitution | 55 | 5 | 0.005 | Nickel | Reduction | 85 | 1 | 0.2 |
| Example 11 | Gold | Substitution | 80 | 5 | 0.005 | Palladium | Substitution | 55 | 5 | 0.005 | Nickel | Reduction | 85 | 1 | 0.2 |
| Example 12 | Gold | Substitution | 80 | 5 | — | Palladium | Substitution | 55 | 5 | 0.005 | Nickel | Reduction | 85 | 1 | 0.2 |
| Comparative Example 1 | — | — | — | — | — | — | — | — | — | — | Nickel | Reduction | 85 | 1 | 0.2 |
| Comparative Example 2 | — | — | — | — | — | Palladium | Substitution | 55 | 5 | 0.005 | Nickel | Reduction | 85 | 1 | 0.2 |
| Comparative Example 3 | — | — | — | — | — | — | — | — | — | — | Nickel | Reduction | 85 | 1 | 0.2 |
| Comparative Example 4 | — | — | — | — | — | — | — | — | — | — | Nickel | Reduction | 85 | 25 | 5 |

| | Plating layer D | | | | | Plating layer E | | | | | | Good product rate of solder bondability (%) |
|---|---|---|---|---|---|---|---|---|---|---|---|---|
| | Component metal | Method of plating | Temperature (°C) | Time (minutes) | Film thickness (μm) | Component metal | Method of plating | Temperature (°C) | Time (minutes) | Film thickness (μm) | Voids | |
| Example 1 | Gold | Substitution | 80 | 5 | 0.03 | — | — | — | — | — | No | 100 |
| Example 2 | Gold | Substitution | 80 | 5 | 0.03 | — | — | — | — | — | No | 100 |
| Example 3 | Gold | Substitution | 80 | 5 | 0.03 | — | — | — | — | — | No | 100 |
| Example 4 | Gold | Substitution | 80 | 5 | 0.03 | — | — | — | — | — | No | 100 |
| Example 5 | Gold | Substitution | 80 | 5 | 0.03 | — | — | — | — | — | No | 100 |
| Example 6 | Gold | Substitution | 80 | 5 | 0.03 | — | — | — | — | — | No | 100 |
| Example 7 | Gold | Substitution | 80 | 5 | 0.03 | — | — | — | — | — | No | 100 |
| Example 8 | Gold | Substitution | 80 | 5 | 0.03 | — | — | — | — | — | No | 100 |
| Example 9 | Gold | Substitution | 80 | 10 | 0.05 | — | — | — | — | — | No | 100 |
| Example 10 | Palladium | Reduction | 80 | 10 | 0.1 | — | — | — | — | — | No | 100 |
| Example 11 | Palladium | Reduction | 70 | 10 | 0.1 | Gold | Reduction | 80 | 10 | 0.05 | No | 100 |
| Example 12 | Gold | Substitution | 80 | 5 | 0.03 | — | — | — | — | — | No | 100 |
| Comparative Example 1 | — | — | — | — | — | — | — | — | — | — | Yes | 0 |
| Comparative Example 2 | Palladium | Reduction | 70 | 10 | 0.1 | — | — | — | — | — | Yes | 20 |

TABLE 1-continued

| | | | | | | | | | | | |
|---|---|---|---|---|---|---|---|---|---|---|---|
| Comparative Example 3 | Palladium | Reduction | 70 | 10 | 0.1 | Gold | Reduction | 80 | 10 | 0.05 | Yes | 20 |
| Comparative Example 4 | Palladium | Reduction | 70 | 10 | 0.1 | Gold | Reduction | 80 | 10 | 0.05 | Yes | 100 |

In the plating stack, which was produced by forming plating layers in the order of the plating layer A, the plating layer B and the plating layer C on the objet to be plated, the plating layer C was formed without generation of voids. Good solder bondability was observed even when the plating layer C (the nickel layer) was thin.

INDUSTRIAL APPLICABILITY

A method for producing a plating stack of the present invention can stably produce a plating stack having performance required for surface of conductor circuits or the like while maintaining high solder bonding strength. The present invention can be widely used in the field such as manufacturing of electrical and electronic component and so on.

REFERENCE SIGNS LIST

S: object to be plated
A: plating layer A
B: plating layer B
C: plating layer C
D: plating layer D
E: plating layer E

The invention claimed is:

1. A method for producing a plating stack in which a plating layer A mainly composed of a second metal is deposited on an object to be plated mainly composed of a first metal, then a plating layer B mainly composed of palladium is deposited on the plating layer A, and then a plating layer C mainly composed of nickel is deposited on the plating layer B,
wherein the plating layer A is a porous film or a nucleus-like layer,
wherein the plating layer B is a substitution plating layer formed by a substitution reaction between an ion of palladium contained in a substitution plating solution, and the first metal contained in the object to be plated,
wherein the plating layer C is a reduction plating layer formed by a redox reaction between a reducing agent and a nickel ion contained in a reduction plating solution.

2. The method for producing a plating stack according to claim 1, wherein the first metal is copper.

3. The method for producing a plating stack according to claim 1, wherein the second metal is gold, platinum or silver.

4. The method for producing a plating stack according to claim 1, wherein the first metal is copper, and wherein the second metal is gold, platinum or silver.

5. The method for producing a plating stack according to claim 1, wherein the plating layer A is a substitution plating layer formed by a substitution reaction between an ion of the second metal contained in a substitution plating solution and the first metal contained in the object to be plated.

6. The method for producing a plating stack according to claim 4, wherein the plating layer A is a substitution plating layer formed by a substitution reaction between an ion of the second metal contained in a substitution plating solution and the first metal contained in the object to be plated.

7. The method for producing a plating stack according to claim 1, wherein after the plating layer C is deposited, a plating layer D mainly composed of a metal which differs from nickel is deposited on the plating layer C.

8. The method for producing a plating stack according to claim 4, wherein after the plating layer C is deposited, a plating layer D mainly composed of a metal which differs from nickel is deposited on the plating layer C.

9. The method for producing a plating stack according to claim 7, wherein a metal which is a main component of the plating layer D is gold or palladium.

10. The method for producing a plating stack according to claim 8, wherein a metal which is a main component of the plating layer D is gold or palladium.

11. The method for producing a plating stack according to claim 9, wherein after the plating layer D is deposited, a plating layer E mainly composed of a metal which differs from that of the plating layer D is deposited on the plating layer D.

12. The method for producing a plating stack according to claim 10, wherein after the plating layer D is deposited, a plating layer E mainly composed of a metal which differs from that of the plating layer D is deposited on the plating layer D.

13. The method for producing a plating stack according to claim 11, wherein a metal which is a main component of the plating layer E is gold.

14. The method for producing a plating stack according to claim 12, wherein a metal which is a main component of the plating layer E is gold.

* * * * *